United States Patent
Guo et al.

(10) Patent No.: US 11,741,435 B1
(45) Date of Patent: Aug. 29, 2023

(54) ONLINE SESSION SCHEDULING FROM A NETWORKING PLATFORM

(71) Applicant: Meta Platforms, Inc., Menlo Park, CA (US)

(72) Inventors: Hong Guo, Foster City, CA (US); Zhi Min Seetoh, San Mateo, CA (US); Nathaniel Owen Hajian, San Francisco, CA (US); Zachary Moore, Woodacre, CA (US); Yeuko Ogawa, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 45 days.

(21) Appl. No.: 17/315,174

(22) Filed: May 7, 2021

Related U.S. Application Data

(60) Provisional application No. 63/143,764, filed on Jan. 29, 2021.

(51) Int. Cl.
*G06Q 10/1093* (2023.01)
*H04L 65/1066* (2022.01)
*G06Q 50/00* (2012.01)
*H04L 51/52* (2022.01)

(52) U.S. Cl.
CPC ..... *G06Q 10/1095* (2013.01); *H04L 65/1066* (2013.01); *G06Q 50/01* (2013.01); *H04L 51/52* (2022.05)

(58) Field of Classification Search
CPC .............. G06Q 10/1095; G06Q 50/01; H04L 65/1066; H04L 51/32
See application file for complete search history.

(56) References Cited

U.S. PATENT DOCUMENTS

| | | | |
|---|---|---|---|
| 9,639,608 B2 * | 5/2017 | Freeman | G06F 16/95 |
| 10,684,738 B1 * | 6/2020 | Sicora | G06F 16/435 |
| 2012/0209677 A1 * | 8/2012 | Mehta | G06Q 20/3276 |
| | | | 705/14.16 |

(Continued)

FOREIGN PATENT DOCUMENTS

KR 20140041859 A * 4/2014 ............ H04W 76/40

*Primary Examiner* — Patrice L Winder
*Assistant Examiner* — Angela M Widhalm De Rodriguez
(74) *Attorney, Agent, or Firm* — McDermott Will & Emery LLP

(57) ABSTRACT

Methods, systems, and storage media for the online scheduling of sessions or appointments from within a networking platform are disclosed. Exemplary implementations may: receive an image or video including a tag identifying a provider or a service of a provider; cause display of the image/video in a feed, story, or reel associated with a user of the networking platform; receive a selection of the tag; in response to the tag selection, cause display of information associated with the provider, the information including a selectable session request indicator; receive a request to engage in a session(s) with the provider (via user selection of the session request indicator); receive detail(s) associated with the engagement request; receive an indication that the request is complete; and send, via a networking-platform-specific communication application, a communication to the user informing the user of request approval or rejection, or indicating the request is pending.

20 Claims, 10 Drawing Sheets

(56) References Cited

U.S. PATENT DOCUMENTS

| | | | | |
|---|---|---|---|---|
| 2014/0019555 | A1* | 1/2014 | Cai | G06Q 50/01 |
| | | | | 709/205 |
| 2014/0222703 | A1* | 8/2014 | Smith | G06Q 50/01 |
| | | | | 705/319 |
| 2016/0350799 | A1* | 12/2016 | Johnson | G06Q 30/0273 |
| 2019/0188783 | A1* | 6/2019 | Bridgeford | G06Q 20/12 |
| 2020/0288274 | A1* | 9/2020 | Burcheci | G06Q 10/1095 |
| 2021/0133160 | A1* | 5/2021 | Craft | G06Q 30/0631 |

* cited by examiner

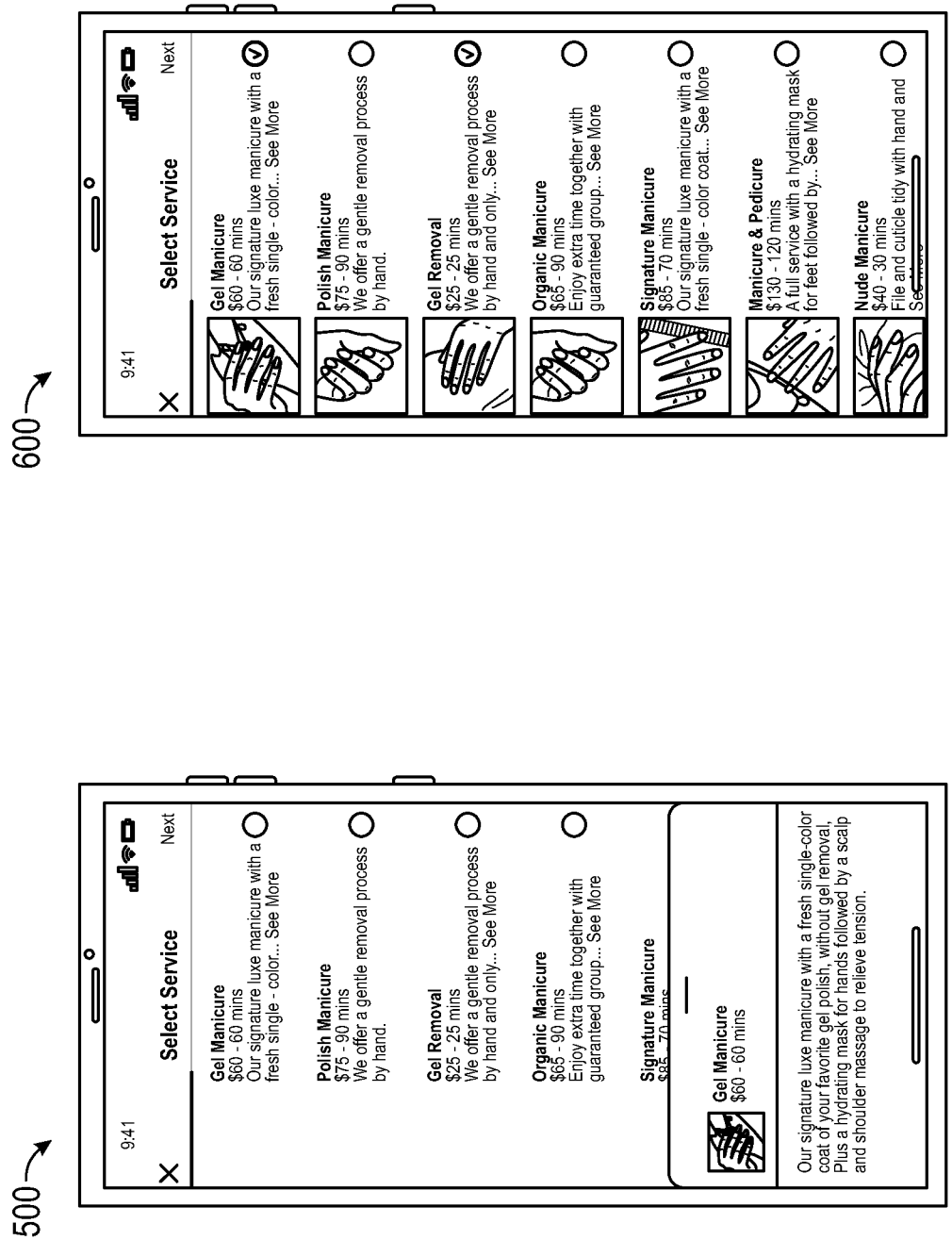

ONLINE SESSION SCHEDULING FROM A NETWORKING PLATFORM

CROSS-REFERENCE TO RELATED APPLICATIONS

The present application claims the benefit of priority under 35 U.S.C. § 119 from U.S. Provisional Patent Application Ser. No. 63/143,764 entitled "Online Session Scheduling from a Networking Platform," filed on Jan. 29, 2021, the disclosure of which is hereby incorporated by reference in its entirety for all purposes.

TECHNICAL FIELD

The present disclosure generally relates to the online scheduling of sessions, and more particularly to the online scheduling of appointments with service providers from within a social networking platform, and receiving notifications regarding appointments scheduled through the platform via a communication (e.g., messaging) application specific to the social networking platform.

BACKGROUND

Social media networking platforms are an increasingly popular way for users to learn what their connections are doing and liking, as well as with what, or whom, their connections are engaged. By viewing the posts that are displayed on a user's feed, story, or reel, or on those of their connections, users are able to learn about services in which they may be interested. Unfortunately, once a user views information about a service s/he likes (for instance, "after" images posted on a social networking platform by a connection that received a particular service), the social networking platform offers limited opportunity for engagement with the provider of the liked service.

BRIEF SUMMARY

The subject disclosure provides for systems, methods and storage media for the online scheduling of sessions or appointments. A user may be permitted to initiate scheduling of an appointment for a desired service from within a networking platform, for instance, a social networking platform. For example, a user may be permitted to initiate scheduling of an appointment by selection of a tag associated with an item of digital media displayed in the user's feed on a social networking platform.

One aspect of the present disclosure relates to a method for online scheduling from within a networking platform. The method may include causing display of an image or video in association with a feed, a story, or a reel of a user of a networking platform, the image or video including a tag identifying a provider having a networking-platform presence or a session of (i.e., offered by) the provider. The method may include receiving, at the networking platform, selection of the tag. The method may include, responsive to receiving selection of the tag, causing display of information associated with the provider including an indicator, selection of which causes submission of a request to engage in the session of the provider. The method may include receiving, at the networking platform, the request to engage in the session. The method may include, responsive to receiving the request to engage in the session, sending, via a communication application (e.g., a messaging application) specific to the networking platform, a communication including approval or rejection of the request, or information that the request has been sent to the provider.

Another aspect of the present disclosure relates to a system configured for online scheduling from within a networking platform. The system may include one or more hardware processors configured by machine-readable instructions. The processor(s) may be configured to receive, at a server of the networking platform, an image or a video. The image or the video may include at least one tag identifying at least one of a provider having a presence on the networking platform or providing a description of a session offered by the provider. The processor(s) may be configured to cause display of the image/video in association with at least one of a feed, a story, or a reel associated with a user of the networking platform. The processor(s) may be configured to receive, at the server of the networking platform, a selection of the at least one tag. The processor(s) may be configured to, responsive to receipt of the selection of the at least one tag, cause display of information associated with the provider having the presence on the networking platform. The information may include a selectable indicator, selection of which causes submission, to the server of the networking platform, of a request to engage in one or more sessions with the provider having the presence on the networking platform. The processor(s) may be configured to receive, at the server of the networking platform, the request from the user to engage in the session(s) with the provider. The processor(s) may be configured to receive, at the server of the networking platform, one or more details associated with the request to engage in the session(s) with the provider. The processor(s) may be configured to receive, at the server of the networking platform, an indication that the request to engage in the session(s) with the provider is complete. The processor(s) may be configured to, responsive to receipt of the indication that the request to engage in the session(s) with the provider is complete, send, from the server of the networking platform via a communication application specific to the networking platform, a communication to the user. The communication may include one or more of an approval of the request to engage in the session(s) with the provider, a rejection of the request to engage in the session(s) with the provider, or information that the request to engage in the session(s) with the provider has been sent to the provider.

Yet another aspect of the present disclosure relates to a non-transitory computer-readable storage medium having instructions embodied thereon, the instructions being executable by one or more processors to perform a method for scheduling sessions or appointments online. The method may include receiving, at a server of a networking platform, an image or a video. The image/video may include at least one tag identifying at least one of a provider having a presence on the networking platform or providing a description of a session offered by the provider having the presence on the networking platform. The method may include causing display of the image/video in association with at least one of a feed, a story, or a reel associated with a user of the networking platform. The method may include receiving, at the server of the networking platform, a selection of the at least one tag. The method may include, responsive to receiving the selection of the at least one tag, causing display of information associated with the provider having the presence on the networking platform. The information may include a selectable indicator, selection of which causes submission, to the server of the networking platform, of a request to engage in one or more sessions with the provider. The method may include receiving, at the server of the networking platform, the request from the user to engage in the session(s) with the provider. The method may include receiving, at the server of the networking platform, one or more details associated with the request to engage in the session(s) with the provider. The method may include receiving, at the server of the networking platform, an indication that the request to engage in the session(s) with the provider is complete. The method may include, responsive to receiving the indication that the request to engage in the session(s) with the provider is complete, sending, from the server of the networking platform via a communication application specific to the networking platform, a communication to the user. The communication may include one or more of an approval of the request to engage in the session(s) with the provider, a rejection of the request to engage in the session(s) with the provider, or information that the request to engage in the session(s) with the provider has been sent to the provider.

Still another aspect of the present disclosure relates to a system configured for scheduling sessions or appointments online. The system may include means for receiving, at a server of a networking platform, an image or a video. The image/video may include at least one tag identifying at least one of a provider having a presence on the networking platform or providing a description of a session offered by the provider. The system may include means for causing display of the image/video in association with at least one of a feed, a story, or a reel associated with a user of the networking platform. The system may include means for receiving, at the server of the networking platform, a selection of the at least one tag. The system may include, responsive to receiving the selection of the at least one tag, means for causing display of information associated with the provider having the presence on the networking platform. The information may include a selectable indicator, selection of which causes submission, to the server of the networking platform, of a request to engage in one or more sessions with the provider. The system may include means for receiving, at a server of a networking platform, the request from the user to engage in the session(s) with the provider. The system may include means for receiving, at the server of the networking platform, one or more details associated with the request to engage in the session(s) with the provider. The system may include means for receiving, at the server of the networking platform, an indication that the request to engage in the session(s) with the provider is complete. The system may include, responsive to receiving the indication that the request to engage in the session(s) with the provider is complete, means for sending, from the server of the networking platform via a communication application specific to the networking platform, a communication to the user. The communication may include one or more of an approval of the request to engage in the session(s) with the provider, a rejection of the request to engage in the session(s) with the provider, or information that the request to engage in the session(s) with the provider has been sent to the provider.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 2-15 illustrate exemplary screen displays that may be presented for the online scheduling of appointments from within a social networking platform, according to certain aspects of the present disclosure.

Figure 1:
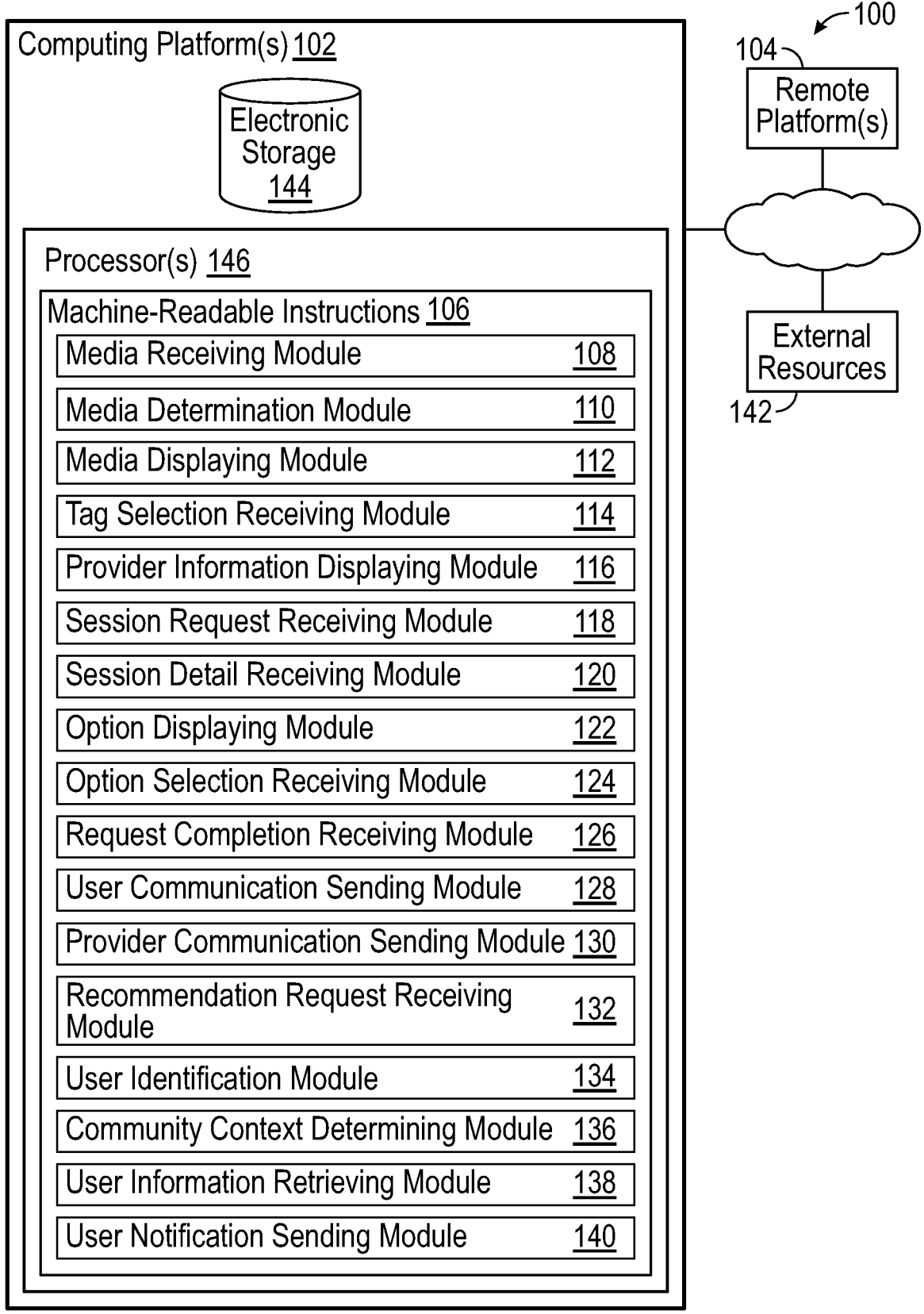
FIG. 1 illustrates a system configured for the online scheduling of appointments from within a social networking platform, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Social media networking platforms are an increasingly popular way for users to learn what their connections are doing and liking, as well as with what, or whom, their connections are engaged. By viewing the posts, stories, or reels that are presented to the user, as well as media that is sponsored by various service providers, users are able to learn about services in which they may be interested. Additionally, with networking platforms increasingly supporting and encouraging the posting of visual media, it is becoming much simpler for a user to know if they are likely to enjoy the results offered by a particular service provider.

Once a user views information about a service that they like (for instance, "after" images posted on a social networking platform by a connection that received a particular service), social networking platforms have traditionally offered limited opportunity for engagement with the provider of the liked service. The user may be able to navigate to a business profile on the networking platform that is associated with the provider of the service but if they desire to book the service (or another service offered by the provider) for themselves, they must navigate out of the social networking platform to another digital location of the service provider. This action is cumbersome for the user and decreases the likelihood that the user will engage with the service provider.

Implementations described herein address these and other problems by enabling the online scheduling of service sessions or appointments from within a social networking platform. For example, a user may be permitted to initiate scheduling of an appointment by selection of a tag associated with an item of digital media displayed in the user's feed on a social networking platform. Upon selection of the tag, the user may be navigated to a business profile page of the service provider where a selectable indicator may be displayed, selection of which may initiate an appointment scheduling flow. By way of non-limiting example, service businesses for which implementations described herein may be utilized include hair salons, yoga studios, dog walking services, plumbing services, landscaping services, language instruction services, real estate services, restaurants, catering, and the like.

The disclosed system addresses a problem in traditional online scheduling tied to computer technology, namely, the technical problem of navigating between digital locations to schedule services online. The disclosed system solves this technical problem by providing a solution also rooted in computer technology, namely, by providing for the ability to initiate the online scheduling of service appointments from the same networking platform in which the provider of the service was discovered. The disclosed subject technology further provides improvements to the functioning of the computer itself because it reduces processing and bandwidth costs associated with conventional online scheduling.

FIG. 1 illustrates a system 100 configured for the online scheduling of appointments or service sessions from within a social networking platform, according to certain aspects of the disclosure. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of a media receiving module 108, a media determination module 110, a media displaying module 112, a tag selection receiving module 114, a provider information displaying module 116, a session request receiving module 118, a session detail receiving module 120, an option displaying module 122, an option selection receiving module 124, a request completion receiving module 126, a user communication sending module 128, a provider communication sending module 130, a recommendation receiving module 132, a user identification module 134, a community context determining module 136, a user information retrieving module 138, a user notification sending module 140, and/or other instruction modules.

Media receiving module 108 may be configured to receive, one or more digital media items (e.g., digital images or videos). In some implementations, media receiving module 108 may be configured to receive the digital media item(s) at a server of a networking platform, for instance, a social media networking platform. In some implementations, the image or the video may include at least one tag associated therewith that identifies a provider having a presence on the networking platform and/or provides a description of a session offered by a provider having a presence on the networking platform. By way of non-limiting example, the provider may be a service provider. By way of non-limiting example, the description of the session offered by the provider having the presence on the networking platform may be a description of one or more services for which the provider permits online scheduling of sessions.

Media determination module 110 may be configured to determine one or more digital media items (e.g., digital images or videos) to cause to be displayed (e.g., by the media displaying module 112, more fully described below) in association with at least one of a feed, a story, or a reel associated with a user of the networking platform. In some implementations, the media determination module 110 may determine to cause to be displayed an image or video that includes at least one tag associated therewith. By way of non-limiting example, a tag associated with a displayed image or video may identify a provider having a presence on the networking platform and/or provide a description of a session offered by a provider having a presence on the networking platform. In some implementations, the media determination module 110 may determine to cause to be displayed an image/video that was tagged by a connection of the user on the networking platform and/or otherwise based on community context of the user.

Figures 2, 3, 4:
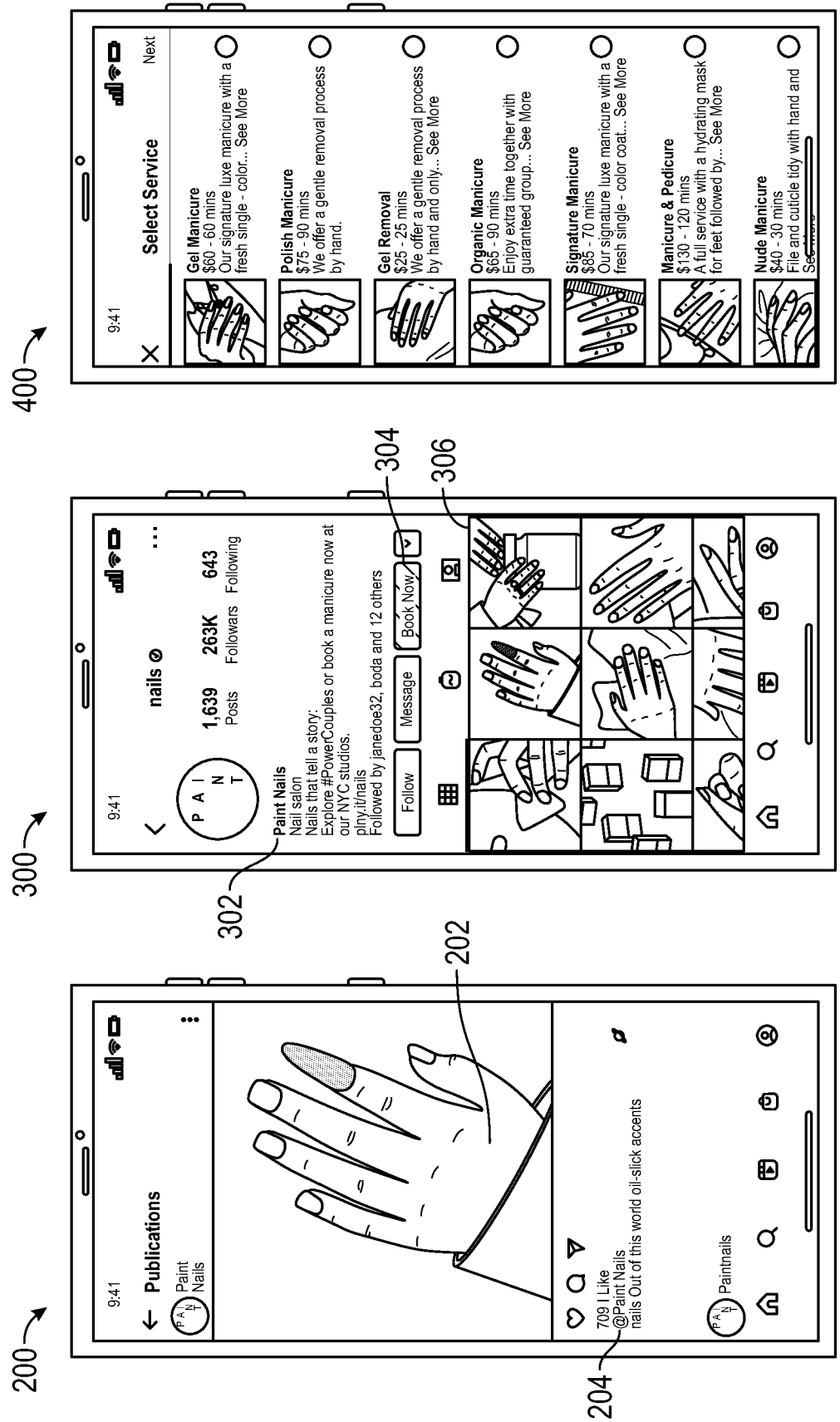

Media displaying module 112 may be configured to cause display of a received image or video (e.g., an image or video received by media receiving module 108). In some implementations, the media displaying module 112 may cause a received image or video to be displayed in association with at least one of a feed, a story, or a reel associated with a user of a networking platform. In some implementations, a tag associated with a received image or video also may be displayed utilizing the media displaying module 112. By way of non-limiting example, and with reference to FIG. 2, illustrated is an exemplary screen display 200 showing display of an image 202 in association with a user feed on a social networking platform. Also illustrated in the exemplary screen display 200 is display of a tag 204 associated with the displayed image 202.

With reference back to FIG. 1, tag selection receiving module 114 may be configured to receive a selection of at least one tag, for instance, a tag(s) associated with a displayed image or video on a user feed, story, or reel associated with a user account on a networking platform. In some implementations, tag selection receiving module 108 may be configured to receive the tag selection at a server of a networking platform, for instance, a social media networking platform. By way of non-limiting example, a selected tag may identify a provider having a presence on the networking platform. By way of non-limiting example, the provider may be a service provider and a selected tag may provide a description of a service for which a session or appointment is offered by the provider.

Provider information displaying module 116 may be configured to, responsive to receiving a selection of at least one tag (e.g., a tag associated with a digital media item displayed in association with a user's feed, story, or reel), cause display of information associated with the tagged provider or a provider offering online booking of a session referenced in the selected tag. By way of non-limiting example, and with reference to FIG. 3, illustrated is an exemplary screen display 300 showing provider information 302 associated with a selected tag. In the exemplary screen display 300 shown in FIG. 3, the provider information 302 has been caused to be displayed in response to a user selection of the tag 204 of FIG. 2.

In some implementations, the displayed provider information may include a selectable indicator, selection of which may cause submission of a request to engage in one or more sessions with the tagged provider or the provider offering online booking of the session(s) referenced in the selected tag. By way of non-limiting example, the exemplary screen display 300 of FIG. 3 shows a selectable indicator 304 having the words "Book Now" displayed thereon. In some implementations, selection of the selectable indicator 304 may cause submission of a request to engage in one or more sessions with the provider referenced in the selected tag (that is, the tagged provider or the provider offering online booking of the session(s) referenced in the selected tag). Selection of the selectable indicator 304 of FIG. 3 may cause display of the exemplary screen display 400 of FIG. 4, more fully described below.

In some implementations, the provider referenced in the selected tag may be a service provider having a business profile associated with the networking platform. By way of non-limiting example, in some such implementations, the provider information displaying module 116 may be configured to cause display of the business profile of the provider referenced in the selected tag (e.g., as the provider information).

By way of non-limiting example, the business profile of the provider referenced in the selected tag may include one or more additional digital media items, at least a portion of which are associated with a tag identifying the provider and/or a service offered by the provider. By way of non-limiting example, the exemplary screen display 300 of FIG. 3 shows a plurality of additional media items 306 displayed in association with the provider information 302. In some implementations, at least a portion of the tag(s) may have been associated with the digital media item(s) by a connection of the user on the networking platform.

With reference back to FIG. 1, session request receiving module 118 may be configured to receive the request from the user to engage in the one or more sessions with the provider referenced in the selected tag. In some implementations, the request from the user to engage in the session(s) with the provider referenced in the selected tag may be received at a server of the networking platform.

Session detail receiving module 120 may be configured to receive one or more details associated with the request to engage in the session(s) with the provider referenced in the selected tag. In some implementations, the request detail(s) may be received at a server of the networking platform. By way of non-limiting example, the request detail(s) may include an identity of a user submitting the request, an identity of a desired service for which the user submitting the request would like to book a session, a date and/or time for which the user would like to have the session booked, and an identity of a particular service provider associated with the provider referenced in the selected tag, if applicable.

Option displaying module 122 may be configured to, responsive to receiving a request to engage in session(s) with a provider having a presence on a networking platform, cause display of a plurality of options for at least one of the details associated with the request. By way of non-limiting example, the plurality of options may include at least one of available services for which sessions are offered by the provider, available dates associated with one or more of the available services, available times associated with the available service(s), or available service providers associated with the provider having the presence on the networking platform. In some implementations, the available services for which sessions are offered by the provider may be based on a standardized template of services offered in the industry of the provider.

Option selection receiving module 124 may be configured to receive a selection of an option of the plurality of options (e.g., displayed by the option displaying module 122) for at least one detail. In some implementations, the selection of an option(s) for the at least one detail may be received at a server of the networking platform.

By way of non-limiting example, FIG. 4 illustrates an exemplary screen display 400 showing a plurality of options for services offered by the provider whose provider information is displayed in FIG. 3. By way of non-limiting example, selection of one of the options may cause to display (for instance, by option displaying module 122 of FIG. 1) additional information about the selected service. With reference to FIG. 5, illustrated is an exemplary screen display 500 that may result upon selection of the "Gel Manicure" service listed in the screen display 400 of FIG. 4.

Figure 7:
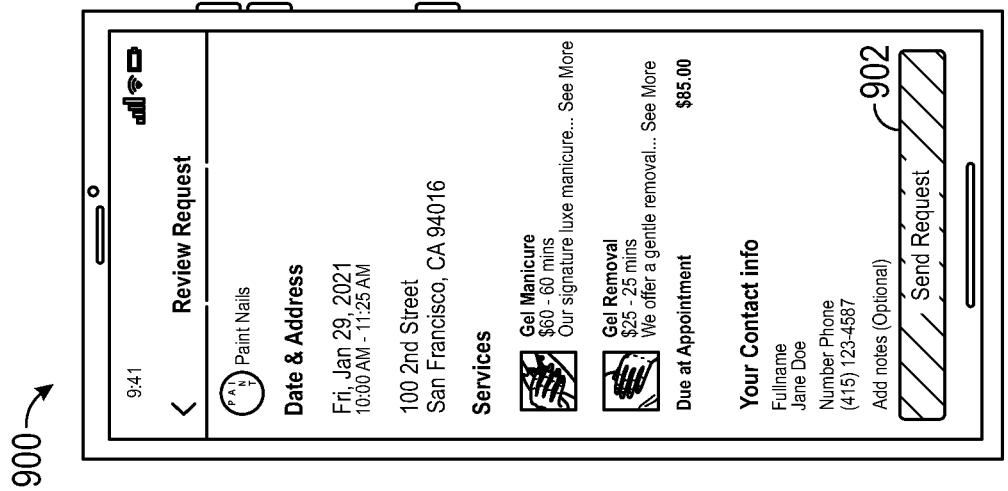
Figure 8:
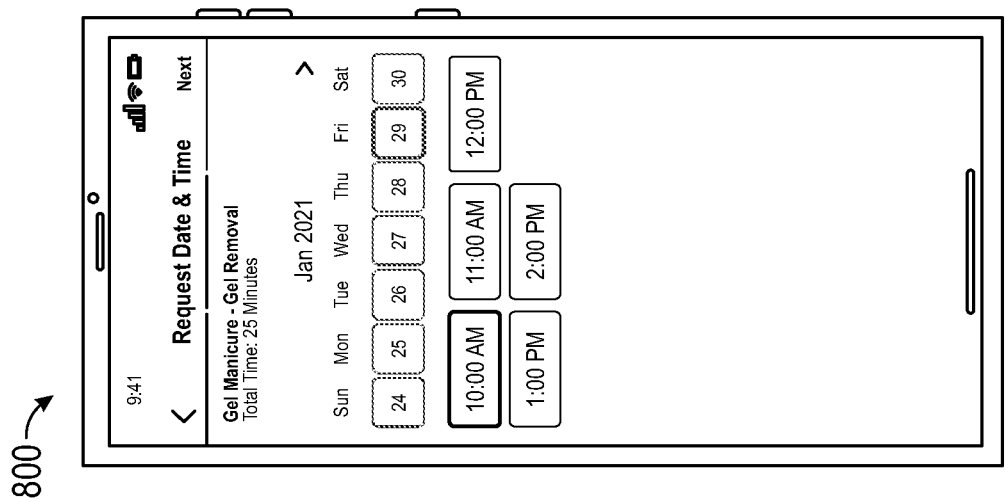

With reference to FIG. 6, illustrated is an exemplary screen display 600 showing selection of two of the services offered by the provider whose information is displayed in FIG. 3 in which a user desires to engage, "Gel Manicure" and "Gel Removal." By way of non-limiting example, upon completion of the service selection in FIG. 6, the exemplary screen displays 700 of FIG. 7 and 800 of FIG. 8 may be caused to be displayed. As can be seen in the exemplary screens displays 700, 800 additional options for user selection may be displayed (requested date and time in the illustrated screen displays) until all the necessary details for the request to engage in the session(s) with the provider are complete.

Figure 9:
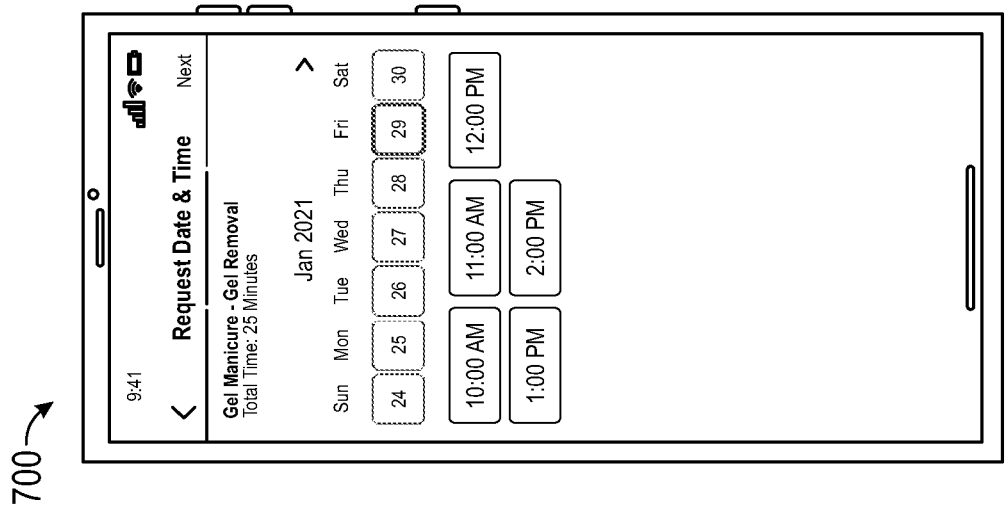

By way of non-limiting example, once all details have been selected, the user may review the details of the request before submitting. The screen display 900 illustrated in FIG. 9 shows an exemplary review screen that the user may assess prior to submitting the request. Once the user is satisfied with the request for service, the "Send Request" indicator 902 may be selected to indicate that the request is complete.

Figure 10:

With reference back to FIG. 1, request completion receiving module 126 may be configured to receive an indication that a request to engage in one or more sessions with a provider having a presence on a networking platform is complete. In some implementations, the indication that the request to engage in one or more sessions with the provider is complete may be received at a server of the networking platform. By way of non-limiting example, the exemplary screen display 1000 of FIG. 10 illustrates a display informing the user that the completed request of FIGS. 6-9 has been submitted.

User communication sending module 128 may be configured to, responsive to receiving an indication that a request to engage in one or more sessions with a provider having a presence on a networking platform is complete, send, via a communication application specific to the networking platform, a communication to the user. By way of non-limiting example, the communication may include an approval of the request to engage in the session(s) with the provider. By way of non-limiting example, the communication may include a rejection of the request to engage in the session(s) with the provider. By way of non-limiting example, the communication may include information that the request to engage in the session(s) with the provider has been sent to the provider (e.g., that the request to engage in the session(s) is pending approval from the provider). In some implementations, the communication to the user via the communication application specific to the networking platform may be sent from a server of the networking platform.

Provider communication sending module 130 may be configured to, responsive to receiving an indication that a request to engage in session(s) with a provider having a presence on a networking platform is complete, send, via a communication application specific to the networking platform, a notification to the provider. By way of non-limiting example, the notification may include the request to engage in the one or more sessions with the provider and at least a portion of one or more details associated with the request to engage in the session(s), e.g., the requested date(s) and time(s) for the session(s). In some implementations, the communication to the provider via the communication application specific to the networking platform may be sent from a server of the networking platform.

Figure 13:
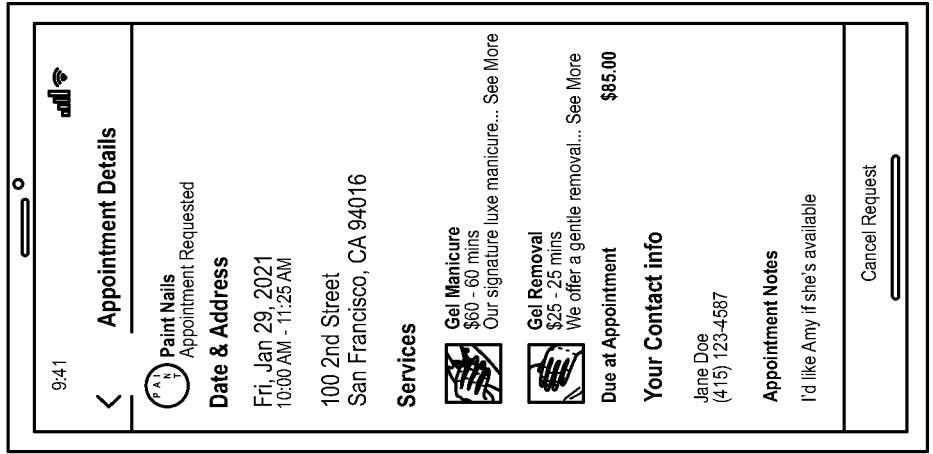
Figure 12:
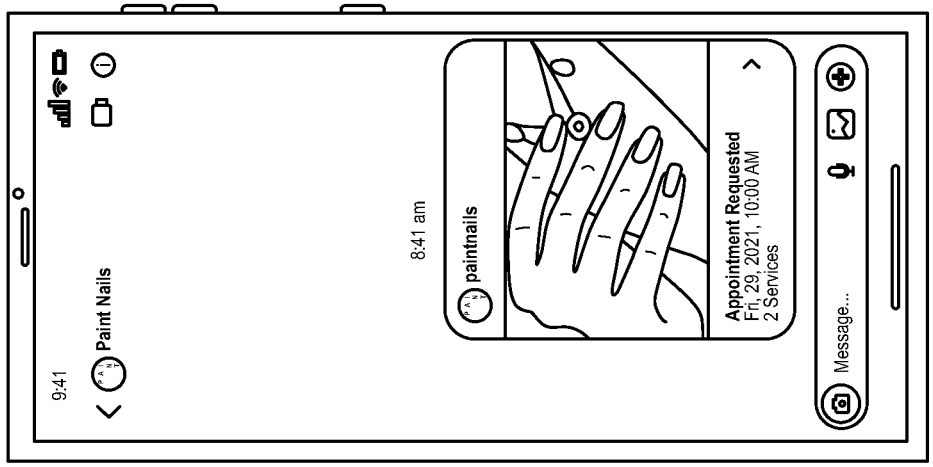
Figure 11:
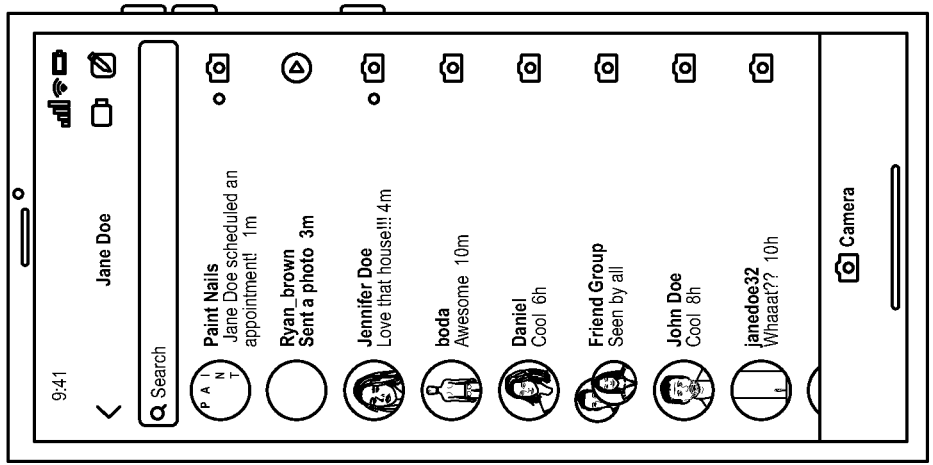

With reference to FIGS. 11, 12 and 13, illustrated are exemplary screen displays 1100, 1200, and 1300, respectively, showing a communication sent to the provider of FIGS. 3-10. The exemplary screen display 1100 of FIG. 11 illustrates a listing of messages received by the provider in association with an inbox associated with the communication application specific to the networking platform. The exemplary screen display 1200 of FIG. 12 may result upon the provider selecting the top message of the listing of messages shown in FIG. 11. The exemplary screen display 1300 of FIG. 13 may result upon the provider selecting the message shown in FIG. 12. From the screen display 1300 of FIG. 13, the provider may approve, reject, or modify the requested session.

Figures 14, 15:
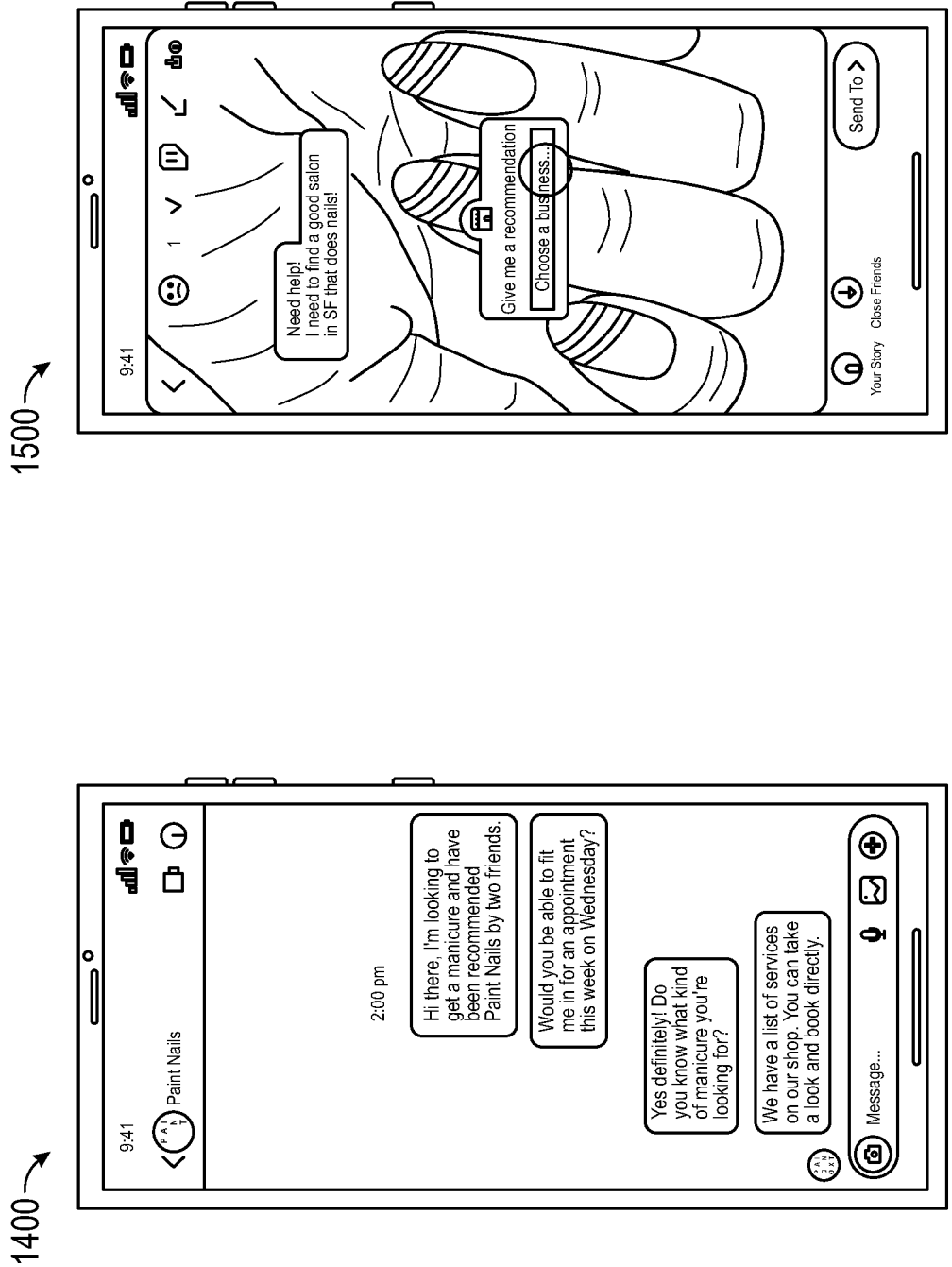

With reference to FIG. 14, illustrated is an exemplary screen display 1400 showing another non-limiting way in which a provider may be contacted regarding a user desiring to schedule an appointment. In the exemplary screen display 1400, the user has submitted a communication directly to the provider (e.g., by instant messaging, or the like) via the communication application specific to the networking platform and the provider has similarly responded.

With reference back to FIG. 1, recommendation receiving module 132 may be configured to receive a user request for provider and/or session recommendations. By way of non-limiting example, FIG. 15 illustrates an exemplary screen display 1500 showing one way in which a user may request recommendations for a provider and/or session. The recommendation receiving module 132 further may be configured to cause display of an image or a video in response to receiving a user request for provider and/or session recommendations. By way of non-limiting example, the image or the video may include at least one tag associated therewith that identifies a provider having a presence on the networking platform and/or provides a description of a session offered by a provider having a presence on the networking platform. By way of non-limiting example, the provider may be a service provider. By way of non-limiting example, the description of the session offered by the provider having the presence on the networking platform may be a description of one or more services that the provider having the presence on the networking platform is offering to perform during a scheduled session. In some implementations, the image or video may be caused to be displayed from a server of the networking platform.

User identification module 134 may be configured to identify a user that is requesting provider and/or session recommendations. By way of non-limiting example, the user identification module 134 may be configured to identify the user requesting the provider and/or session recommendations by querying a server of the networking platform for the user's profile or other information.

Community context determining module 136 may be configured to determine an image or video to cause to be displayed to a user requesting recommendations based, at least in part, on community context of the user. By way of non-limiting example, the community context of the user may include a plurality of digital media items, at least a portion of which include at least one tag identifying a service and/or a service provider. In some implementations, the tag may have been associated with the service and/or the service provider by a connection of the user on the networking platform.

User information retrieving module 138 may be configured to retrieving contact information for the user. By way of non-limiting example, the contact information may include at least one of an email address and a mobile telephone number associated with the user. In some implementations, the user information retrieving module 138 may be configured to retrieve the user's contact information by querying a server of the networking platform for the user's profile or other information.

User notification sending module 140 may be configured to send at least one of an email notification to the email address of the user or a text notification to the mobile telephone number of the user. By way of non-limiting example, the email notification or the text notification may include an approval of the request to engage in the session(s) with the provider having the presence on the networking platform. By way of non-limiting example, the email notification or the text notification may include a rejection of the request to engage in the session(s) with the provider. By way of non-limiting example, the email notification or the text notification may include information that the request to engage in the session(s) with the provider having the presence on the networking platform has been sent to the provider.

In some implementations, computing platform(s) 102, remote platform(s) 104, and/or external resources 142 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 142 may be operatively linked via some other communication media.

A given remote platform 104 may include one or more processors configured to execute computer program modules. The computer program modules may be configured to enable an expert or user associated with the given remote platform 104 to interface with system 100 and/or external resources 142, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 142 may include sources of information outside of system 100, external entities participating with system 100, and/or other resources. In some implementations, some or all of the functionality attributed herein to external resources 142 may be provided by resources included in system 100.

Computing platform(s) 102 may include electronic storage 144, one or more processors 146, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 144 may comprise non-transitory storage media that electronically stores information. The electronic storage media of electronic storage 144 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 144 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 144 may include one or more virtual storage resources (e.g., cloud storage, a virtual private network, and/or other virtual storage resources). Electronic storage 144 may store software algorithms, information determined by processor(s) 146, information received from computing platform(s) 102, information received from remote platform(s) 104, and/or other information that enables computing platform(s) 102 to function as described herein.

Processor(s) 146 may be configured to provide information processing capabilities in computing platform(s) 102. As such, processor(s) 146 may include one or more of a digital processor, an analog processor, a digital circuit designed to process information, an analog circuit designed to process information, a state machine, and/or other mechanisms for electronically processing information. Although processor(s) 146 is shown in FIG. 1 as a single entity, this is for illustrative purposes only. In some implementations, processor(s) 146 may include a plurality of processing units. These processing units may be physically located within the same device, or processor(s) 146 may represent processing functionality of a plurality of devices operating in coordination. Processor(s) 146 may be configured to execute modules 108, 110, 112, 114, 116, 118, 120, 122, 124, 126, 128, 130, 132, 134, 136, 138, 140, and/or other modules. Processor(s) 146 may be configured to execute modules 108, 110, 112, 114, 116, 118, 120, 122, 124, 126, 128, 130, 132, 134, 136, 138, 140, and/or other modules by software; hardware; firmware; some combination of software, hardware, and/or firmware; and/or other mechanisms for configuring processing capabilities on processor(s) 146. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, 132, 134, 136, 138, 140 are illustrated in FIG. 1 as being implemented within a single processing unit, in implementations in which processor(s) 146 includes multiple processing units, one or more of modules 108, 110, 112, 114, 116, 118, 120, 122, 124, 126, 128, 130, 132, 134, 136, 138, and/or 140 may be implemented remotely from the other modules. The description of the functionality provided by the different modules 108, 110, 112, 114, 116, 118, 120, 122, 124, 126, 128, 130, 132, 134, 136, 138, and/or 140 described below is for illustrative purposes, and is not intended to be limiting, as any of modules 108, 110, 112, 114, 116, 118, 120, 122, 124, 126, 128, 130, 132, 134, 136, 138, and/or 140 may provide more or less functionality than is described. For example, one or more of 108, 110, 112, 114, 116, 118, 120, 122, 124, 126, 128, 130, 132, 134, 136, 138, and/or 140 may be eliminated, and some or all of its functionality may be provided by other ones of modules 108, 110, 112, 114, 116, 118, 120, 122, 124, 126, 128, 130, 132, 134, 136, 138, and/or 140. As another example, processor(s) 146 may be configured to execute one or more additional modules that may perform some or all of the functionality attributed below to one of modules 108, 110, 112, 114, 116, 118, 120, 122, 124, 126, 128, 130, 132, 134, 136, 138, and/or 140.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 16:
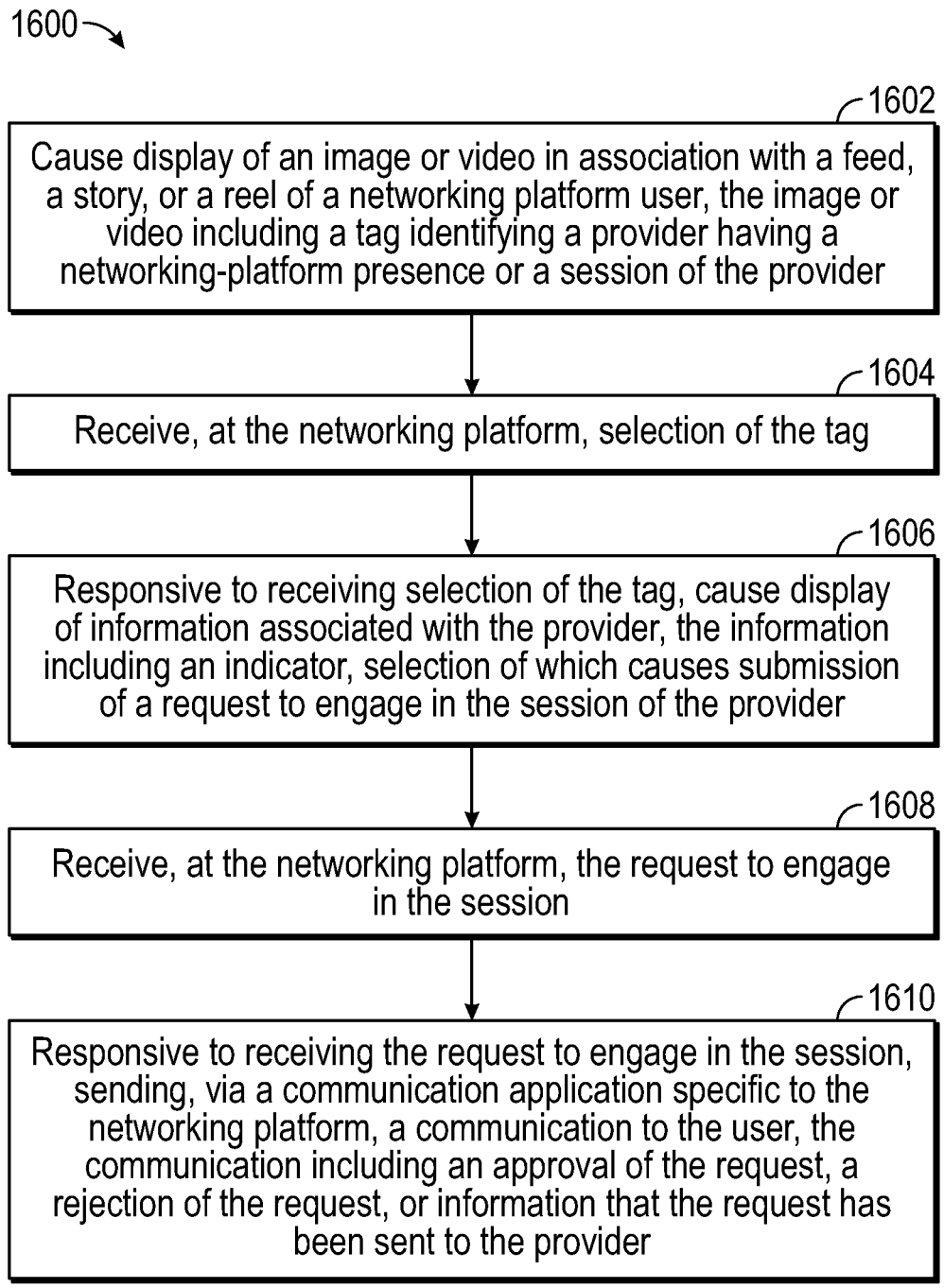
FIG. 16 illustrates an example flow diagram for the online scheduling of appointments from within a social networking platform, according to certain aspects of the disclosure.

Turning to FIG. 16, illustrated is an example flow diagram (e.g., process 1600) for the online scheduling of sessions or appointments from within a social networking platform, according to certain aspects of the disclosure. For explanatory purposes, the example process 1600 is described herein with reference to FIGS. 1-15. Further for explanatory purposes, the steps of the example process 1600 are described herein as occurring in serial, or linearly. However, multiple instances of the example process 1600 may occur in parallel. For purposes of explanation of the subject technology, the process 1600 will be discussed in reference to FIGS. 1-15.

At step 1602, the process 1600 may include causing display of an image or video in association with a feed, a story, or a reel of a user of a networking platform. By way of non-limiting example, the image or video may be caused to be displayed by media displaying module 112 of FIG. 1. By way of non-limiting example, the image or video may have been received by media receiving module 108 of FIG. 1. In some implementations, an image or video that is caused to be displayed may include a tag associated therewith, the tag identifying a provider that has a networking-platform presence or providing a description of a session of (e.g., offered by) a provider that has a networking-platform presence.

In some implementations, an image or video may be caused to be displayed in response to receiving a request from the user for recommendations (e.g., by the recommendation request receiving module 132 of FIG. 1). In some such implementations, the image or video caused to be displayed may be selected (e.g., by the media determination module 110 of FIG. 1) based, at least in part, upon community context of the user. By way of non-limiting example, the community context of the user may include a plurality of digital media items, at least a portion of which have at least one tag identifying one or more of a service or a service provider. In some implementations, the tag may have been associated with the one or more of the service or the service provider by a connection of the user on the networking platform.

At step 1604, the process 1600 may include receiving, at the networking platform, a selection of a tag associated with the displayed image or video. By way of non-limiting example, the selection of the tag may be received by the tag selection receiving module 114 of FIG. 1. At step 1606, the process 1600 may include, responsive to receiving the selection of the tag, causing display of information associated with the provider. By way of non-limiting example, the information associated with the provider may be caused to be displayed by the provider information displaying module 116 of FIG. 1. In some implementations, the provider may be a service provider having a business profile associated with the networking platform. In some such implementations, causing display of information associated with the provider comprises causing display of at least a portion of the business profile of the provider. By way of non-limiting example, the business profile of the provider may include at least one digital media item (e.g., an image or a video) having a tag identifying one or more of the provider or a service offered by the provider, the tag having been associated with the at least one digital media item by a connection of the user on the networking platform. In some implementations, the information associated with the provider may include a selectable indicator, selection of which causes submission of a request to engage in a session of (e.g., offered by) the provider.

At step 1608, the process 1600 may include receiving, at the networking platform, a request to engage in the session(s) with the provider having the networking-platform presence. By way of non-limiting example, the request to engage in the session(s) with the provider may be received by the session request receiving module 118 of FIG. 1.

At step 1610, the process 1600 may include, responsive to receiving the request to engage in the session, sending a communication to the user regarding the session request via a communication application specific to the networking platform. By way of non-limiting example, the communication to the user may include an approval of the request to engage in the session(s) with the provider, a rejection of the request to engage in the session(s) with the provider, or information that the request to engage in the session(s) with the provider has been sent to the provider. By way of non-limiting example, the communication regarding the session may be sent to the user via the communication application specific to the networking platform by the user communication sending module 128 of FIG. 1.

Figure 17:
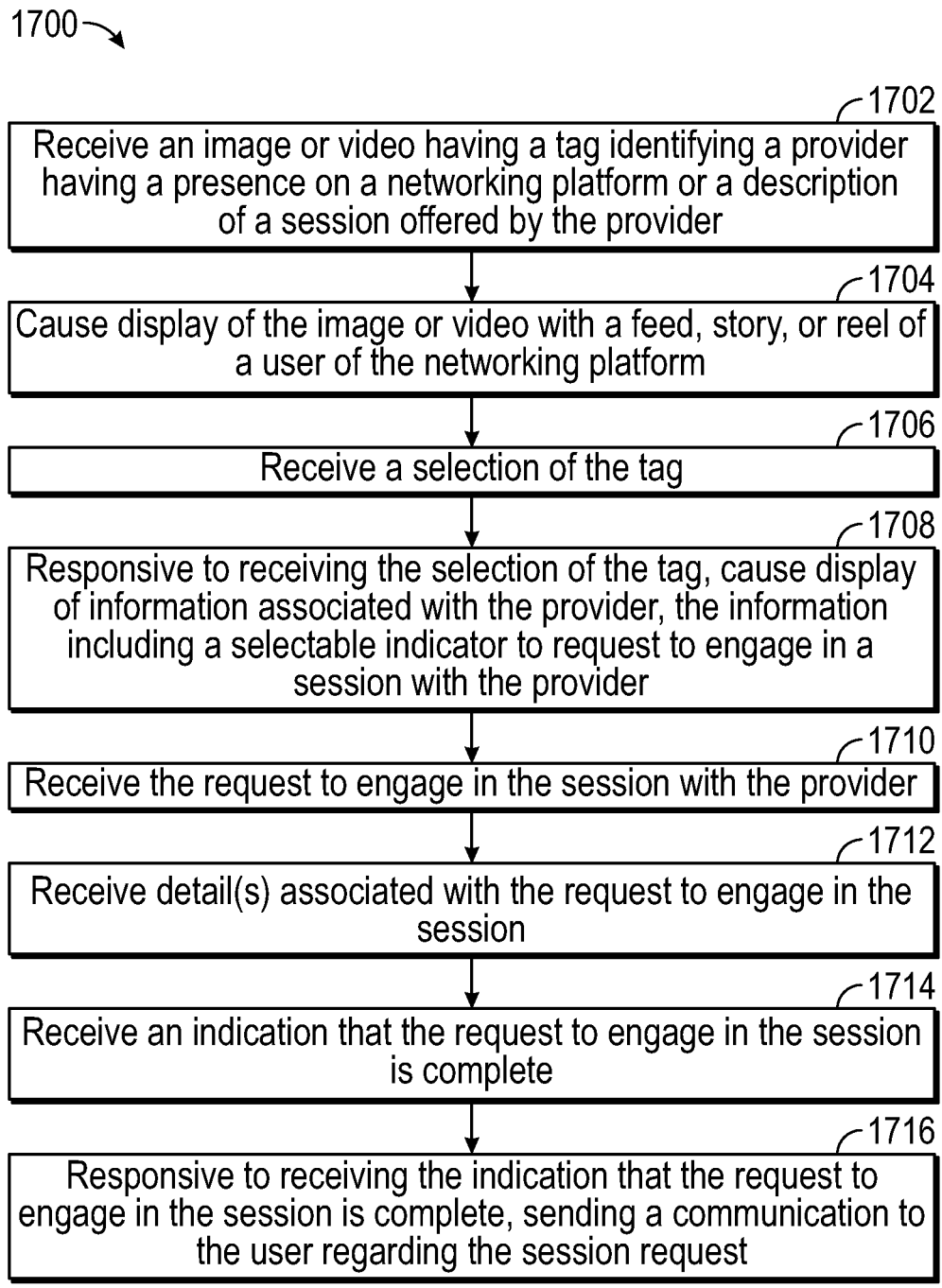
FIG. 17 illustrates an example flow diagram for the online scheduling of appointments from within as social networking platform, according to certain aspects of the disclosure.

With reference now to FIG. 17, illustrated is an example flow diagram (e.g., process 1700) for the online scheduling of sessions or appointments from within a social networking platform, according to certain aspects of the disclosure. For explanatory purposes, the example process 1700 is described herein with reference to FIGS. 1-15. Further for explanatory purposes, the steps of the example process 1700 are described herein as occurring in serial, or linearly. However, multiple instances of the example process 1700 may occur in parallel. For purposes of explanation of the subject technology, the process 1700 will be discussed in reference to FIGS. 1-15.

At step 1702, the process 1700 may include receiving 1702 an image or a video. By way of non-limiting example, the image or video may be received by media receiving module 108 of FIG. 1. In some implementations, the received image or video may have a tag associated therewith, the tag identifying a provider that has a presence on a networking platform or providing a description of a session offered by a provider having a presence on a networking platform.

At step 1704, the process 1700 may include causing display of the received image or video in association with at least one of a feed, story, or reel of a user of the networking platform. By way of non-limiting example, the image or video may be caused to be displayed by media displaying module 112 of FIG. 1.

In some implementations, the received image or video may be caused to be displayed in response to receiving a request from the user for recommendations (e.g., by the recommendation request receiving module 132 of FIG. 1). In some such implementations, the image or video caused to be displayed may be selected (e.g., by the media determination module 110 of FIG. 1) based, at least in part, upon community context of the user. By way of non-limiting example, the community context of the user may include a plurality of digital media items, each digital media item of the plurality having at least one tag identifying one or more of a service or a service provider, the tag having been associated with the one or more of the service or the service provider by a connection of the user on the networking platform.

At step 1706, the process 1700 may include receiving a selection of the tag associated with the displayed image or video. By way of non-limiting example, the selection of the tag may be received by the tag selection receiving module 114 of FIG. 1. At step 1708, the process 1700 may include, responsive to receiving the selection of the tag, causing display of information associated with the provider. By way of non-limiting example, the information associated with the provider may be caused to be displayed by the provider information displaying module 116 of FIG. 1. In some implementations, the information associated with the provider may include a selectable indicator, selection of which causes submission of a request to engage in one or more sessions with the provider. In some implementations, the provider may be a service provider having a business profile associated with the networking platform. In some such implementations, causing display of information associated with the provider comprises causing display of the business profile of the provider. By way of non-limiting example, the business profile of the provider may include at least one digital media item having a tag identifying one or more of the provider or a service offered by the provider, the tag having been associated with the at least one digital media item by a connection of the user on the networking platform.

At step 1710, the process 1700 may include receiving the request to engage in the session(s) with the provider having the presence on the networking platform. By way of non-limiting example, the request to engage in the session(s) with the provider may be received by the session request receiving module 118 of FIG. 1. At step 1712, the process 1700 may include receiving one or more detail(s) associated with the request to engage in the session(s). By way of non-limiting example, the one or more detail(s) associated with the request to engage in the session(s) may be received by the session detail receiving module 120 of FIG. 1.

At step 1714, the process 1700 may include receiving an indication that the request to engage in the session(s) is complete. By way of non-limiting example, the indication that the request to engage in the session(s) is complete may be received by the request completion receiving module 126 of FIG. 1.

At step 1716, the process 1700 may include, responsive to receiving the indication that the request to engage in the session is complete, sending a communication to the user regarding the session request via a communication application specific to the networking platform. By way of non-limiting example, the communication to the user may include an approval of the request to engage in the session(s) with the provider, a rejection of the request to engage in the session(s) with the provider, or information that the request to engage in the session(s) with the provider has been sent to the provider. By way of non-limiting example, the communication regarding the session may be sent to the user via the communication application specific to the networking platform by the user communication sending module 128 of FIG. 1.

Figure 18:
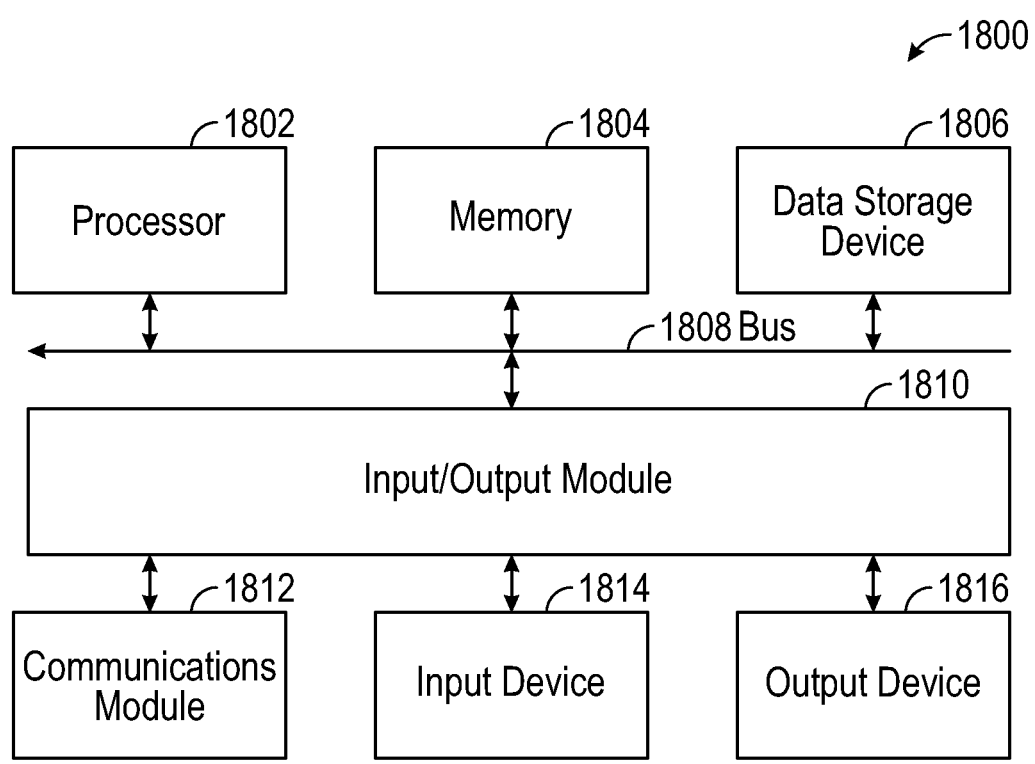
FIG. 18 is a block diagram illustrating an example computer system (e.g., representing both client and server) with which aspects of the subject technology can be implemented.

With reference to FIG. 18, shown is a block diagram illustrating an exemplary computer system 1800 with which aspects of the subject technology can be implemented. In certain aspects, the computer system 1800 may be implemented using hardware or a combination of software and hardware, either in a dedicated server, integrated into another entity, or distributed across multiple entities.

Computer system 1800 (e.g., server and/or client) includes a bus 1808 or other communication mechanism for communicating information, and a processor 1802 coupled with bus 1808 for processing information. By way of example, the computer system 1800 may be implemented with one or more processors 1802. Processor 1802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1800 can include, in addition to hardware, code that creates an execution environment for the computer program in question, e.g., code that constitutes processor firmware, a protocol stack, a database management system, an operating system, or a combination of one or more of them stored in an included memory 1804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1808 for storing information and instructions to be executed by processor 1802. The processor 1802 and the memory 1804 can be supplemented by, or incorporated in, special purpose logic circuitry.

The instructions may be stored in the memory 1804 and implemented in one or more computer program products, i.e., one or more modules of computer program instructions encoded on a computer readable medium for execution by, or to control the operation of, the computer system 1800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1804 may also be used for storing temporary variable or other intermediate information during execution of instructions to be executed by processor 1802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1800 further includes a data storage device 1806 such as a magnetic disk or optical disk, coupled to bus 1808 for storing information and instructions. Computer system 1800 may be coupled via input/output module 1810 to various devices. The input/output module 1810 can be any input/output module. Exemplary input/output modules 1810 include data ports such as USB ports. The input/output module 1810 is configured to connect to a communications module 1812. Exemplary communications modules 1812 include networking interface cards, such as Ethernet cards and modems. In certain aspects, the input/output module 1810 is configured to connect to a plurality of devices, such as an input device 1814 and/or an output device 1816. Exemplary input devices 1814 include a keyboard and a pointing device, e.g., a mouse or a trackball, by which a user can provide input to the computer system 1800. Other kinds of input devices 1814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1816 include display devices such as a LCD (liquid crystal display) monitor, for displaying information to the user.

According to one aspect of the present disclosure, the above-described gaming systems can be implemented using a computer system 1800 in response to processor 1802 executing one or more sequences of one or more instructions contained in memory 1804. Such instructions may be read into memory 1804 from another machine-readable medium, such as data storage device 1806. Execution of the sequences of instructions contained in the main memory 1804 causes processor 1802 to perform the process steps described herein. One or more processors in a multi-processing arrangement may also be employed to execute the sequences of instructions contained in memory 1804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1800 can include clients and servers. A client and server are generally remote from each other and typically interact through a communication network. The relationship of client and server arises by virtue of computer programs running on the respective computers and having a client-server relationship to each other. Computer system 1800 can be, for example, and without limitation, a desktop computer, laptop computer, or tablet computer. Computer system 1800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1802 for execution. Such a medium may take many forms, including, but not limited to, non-volatile media, volatile media, and transmission media. Non-volatile media include, for example, optical or magnetic disks, such as data storage device 1806. Volatile media include dynamic memory, such as memory 1804. Transmission media include coaxial cables, copper wire, and fiber optics, including the wires that comprise bus 1808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1800 reads game data and provides a game, information may be read from the game data and stored in a memory device, such as the memory 1804. Additionally, data from the memory 1804 servers accessed via a network the bus 1808, or the data storage 1806 may be read and loaded into the memory 1804. Although data is described as being found in the memory 1804, it will be understood that data does not have to be stored in the memory 1804 and may be stored in other memory accessible to the processor 1802 or distributed among several media, such as the data storage 1806.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for online scheduling, comprising:
    causing display of an image or video in association with a feed, a story, or a reel of a user of a networking platform, wherein causing display comprises identifying the user by querying a server of the networking platform for a user profile;
    determining the image or video includes a tag associated therewith;
    determining the tag provides a description of a session of a provider;
    determining the provider has a presence on the networking platform;
    responsive to determining the provider has the presence on the networking platform, causing display of the tag in association with the image or video;
    receiving, at the networking platform, selection of the tag;
    responsive to receiving selection of the tag, causing display of information associated with the provider including an indicator, selection of which causes submission of a request to engage in the session of the provider;
    receiving, at the networking platform, the request to engage in the session; and
    responsive to receiving the request to engage in the session, sending, via a communication application specific to the networking platform, a communication including approval or rejection of the request, or information that the request has been sent to the provider.

2. The computer-implemented method of claim 1, wherein the networking platform comprises a social networking platform.

3. The computer-implemented method of claim 1, wherein the provider having the presence on the networking platform is a service provider having a business profile associated with the networking platform.

4. The computer-implemented method of claim 3, wherein causing display of information associated with the provider comprises causing display of the business profile of the provider having the presence on the networking platform.

5. The computer-implemented method of claim 3, wherein the business profile of the provider having the presence on the networking platform further includes at least one digital media item having a tag identifying one or more of the provider or a service of the provider, the tag having been associated with the at least one digital media item by a connection of the user on the networking platform.

6. The computer-implemented method of claim 1, further comprising:
    responsive to receiving the request to engage in the session with the provider having the presence on the networking platform, causing display of a plurality of options for at least one of one or more details associated with the request to engage in the session of the provider having the presence on the networking platform; and
    receiving, at the networking platform, a selection of an option of the plurality of options for the at least one of the one or more details.

7. The computer-implemented method of claim 6, wherein the plurality of options for the at least one of the one or more details associated with the request to engage in the session of the provider having the presence on the networking platform includes at least one of available services for which sessions are offered by the provider, available dates associated with one or more of the available services, available times associated with the one or more of the available services, or available service providers associated with the provider having the presence on the networking platform.

8. The computer-implemented method of claim 7, wherein the available services for which sessions are offered by the provider having the presence on the networking platform are based on a standardized template of services offered in an industry of the provider having the presence on the networking platform.

9. The computer-implemented method of claim 1, further comprising:
    responsive to receiving the request to engage in the session of the provider having the presence on the networking platform, sending from the networking platform via the communication application specific to the networking platform, a notification to the provider having the presence on the networking platform, the notification including the request to engage in the session with the provider and one or more details associated with the request to engage in the session of the provider.

10. The computer-implemented method of claim 1, wherein causing display of the image or the video comprises:
    causing display of the image or the video in response to receiving, at a server of the networking platform, a request from the user for recommendations.

11. The computer-implemented method of claim 1, wherein causing display of the image or the video comprises:
    determining the image or the video to cause to be displayed based, at least in part, on community context of the user.

12. The computer-implemented method of claim 11, wherein the community context of the user includes a plurality of digital media items, each digital media item of the plurality having at least one tag identifying one or more of a service or a service provider, the tag having been associated with the one or more of the service or the service provider by a connection of the user on the networking platform.

13. The computer-implemented method of claim 1, further comprising:
    retrieving contact information for the user, the contact information including at least one of an email address and a mobile telephone number associated with the user; and
    sending at least one of an email notification to the email address of the user or a text notification to the mobile telephone number of the user, the at least one of the email notification or the text notification comprising one or more of the approval or the rejection of the request to engage in the session with the provider having the presence on the networking platform, or the information that the request to engage in the session with the provider having the presence on the networking platform has been sent to the provider.

14. A system configured for online scheduling, the system comprising:
   one or more hardware processors configured by machine-readable instructions to:
   receive, at a server of a networking platform, an image or a video;
   cause display of the image or the video in association with at least one of a feed, a story, or a reel associated with a user of the networking platform, wherein causing display comprises the one or more hardware processors being configured by the machine-readable instructions to identify the user by querying a server of the networking platform for a user's profile;
   determine the image or video includes a tag associated therewith;
   determine the tag provides a description of a session of a provider;
   determine the provider has a presence on the networking platform;
   responsive to determining that the provider has the presence on the networking platform, cause display of the tag in association with the image or video;
   receive, at the server of the networking platform, a selection of the at least one tag;
   responsive to receipt of the selection of the at least one tag, cause display of information associated with the provider having the presence on the networking platform, the information including a selectable indicator, selection of which causes submission, to the server of the networking platform, of a request to engage in one or more sessions with the provider having the presence on the networking platform;
   receive, at the server of the networking platform, the request from the user to engage in the one or more sessions with the provider having the presence on the networking platform;
   receive, at the server of the networking platform, one or more details associated with the request to engage in the one or more sessions with the provider having the presence on the networking platform;
   receive, at the server of the networking platform, an indication that the request to engage in the one or more sessions with the provider having the presence on the networking platform is complete; and
   responsive to receipt of the indication that the request to engage in the one or more sessions with the provider having the presence on the networking platform is complete, send, from the server of the networking platform via a communication application specific to the networking platform, a communication to the user, the communication including one or more of an approval of the request to engage in the one or more sessions with the provider having the presence on the networking platform, a rejection of the request to engage in the one or more sessions with the provider having the presence on the networking platform, or information that the request to engage in the one or more sessions with the provider having the presence on the networking platform has been sent to the provider.

15. The system of claim 14, wherein the networking platform comprises a social networking platform.

16. The system of claim 14, wherein the provider having the presence on the networking platform is a service provider having a business profile associated with the networking platform.

17. The system of claim 16, wherein the one or more hardware processors are configured by machine-readable instructions to cause display of the business profile of the provider having the presence on the networking platform.

18. The system of claim 17, wherein the business profile of the provider having the presence on the networking platform further includes at least one digital media item having a tag identifying one or more of the provider having the presence on the networking platform or a service offered by the provider having the presence on the networking platform, the tag having been associated with the at least one digital media item by a connection of the user on the networking platform.

19. The system of claim 14, wherein responsive to receipt of the indication that the request to engage in the one or more sessions with the provider having the presence on the networking platform is complete, the one or more hardware processors further are configured by the machine-readable instructions to:
   send via the communication application specific to the networking platform, a notification to the provider having the presence on the networking platform, the notification including the request to engage in the one or more sessions and at least a portion of the one or more details associated with the request to engage in the one or more sessions.

20. A non-transient computer-readable storage medium having instructions embodied thereon, the instructions being executable by one or more processors to perform a method for online scheduling, the method comprising:
   receiving, at a server of a networking platform, an image or a video;
   causing display of the image or the video in association with at least one of a feed, a story, or a reel associated with a user of the networking platform, wherein causing display comprises identifying the user by querying a server of the networking platform for a user profile;
   determining the image or video includes a tag associated therewith;
   determining the tag provides a description of a session of a provider;
   determining the provider has a presence on the social networking platform;
   responsive to determining the provider has the presence on the social networking platform, causing display of the tag in association with the image or video;
   receiving, at the server of the networking platform, a selection of the at least one tag;
   responsive to receiving the selection of the at least one tag, causing display of information associated with the provider having the presence on the networking platform, the information including a selectable indicator, selection of which causes submission, to the server of the networking platform, of a request to engage in one or more sessions with the provider having the presence on the networking platform;
   receiving, at the server of the networking platform, the request from the user to engage in the one or more sessions with the provider having the presence on the networking platform;
   receiving, at the server of the networking platform, one or more details associated with the request to engage in the one or more sessions with the provider having the presence on the networking platform;
   receiving, at the server of the networking platform, an indication that the request to engage in the one or more sessions with the provider having the presence on the networking platform is complete; and responsive to receiving the indication that the request to engage in the one or more sessions with the provider having the presence on the networking platform is complete, sending, from the server of the networking platform via a communication application specific to the networking platform, a communication to the user, the communication including one or more of an approval of the request to engage in the one or more sessions with the provider having the presence on the networking platform, a rejection of the request to engage in the one or more sessions with the provider having the presence on the networking platform, or information that the request to engage in the one or more sessions with the provider having the presence on the networking platform has been sent to the provider.

* * * * *